United States Patent
Golan

[19]
[11] Patent Number: 6,129,338
[45] Date of Patent: Oct. 10, 2000

[54] MOTORCYCLE FUEL SYSTEM PETCOCK VALVE

[76] Inventor: Ilan Z. Golan, 4404 Elenda St., Culver City, Calif. 90230

[21] Appl. No.: 09/216,299

[22] Filed: Dec. 18, 1998

Related U.S. Application Data

[60] Provisional application No. 60/070,066, Dec. 30, 1997.

[51] Int. Cl.[7] .................................. F16K 11/083
[52] U.S. Cl. ............... 251/310; 137/625.41; 137/590; 251/312
[58] Field of Search ................... 137/590, 549, 137/625.41, 351; 251/310, 311, 312

[56] References Cited

U.S. PATENT DOCUMENTS

| | | |
|---|---|---|
| D. 363,533 | 10/1995 | Pingel et al. .......................... D23/233 |
| D. 363,762 | 10/1995 | Pingel et al. .......................... D23/233 |
| 1,444,582 | 2/1923 | Burris ..................................... 137/590 |
| 1,521,817 | 1/1925 | Jerdone, Jr. ........................... 137/590 |
| 1,553,698 | 6/1925 | Lombardo ............................. 137/590 |
| 4,250,921 | 2/1981 | Pingel et al. ..................... 137/625.41 |
| 4,957,138 | 9/1990 | Pingel et al. .......................... 137/549 |

*Primary Examiner*—Kevin Shaver
*Assistant Examiner*—John Bastianelli
*Attorney, Agent, or Firm*—Small Larkin, LLP

[57] ABSTRACT

A fuel line petcock valve including a handle which may be oriented in one of several positions so as to orient the inlet and outlet of the petcock valve to conform to different motorcycle fuel systems and to provide a full shut, full open and intermediate position for permitting reserve fuel to be transferred to the valve.

21 Claims, 8 Drawing Sheets

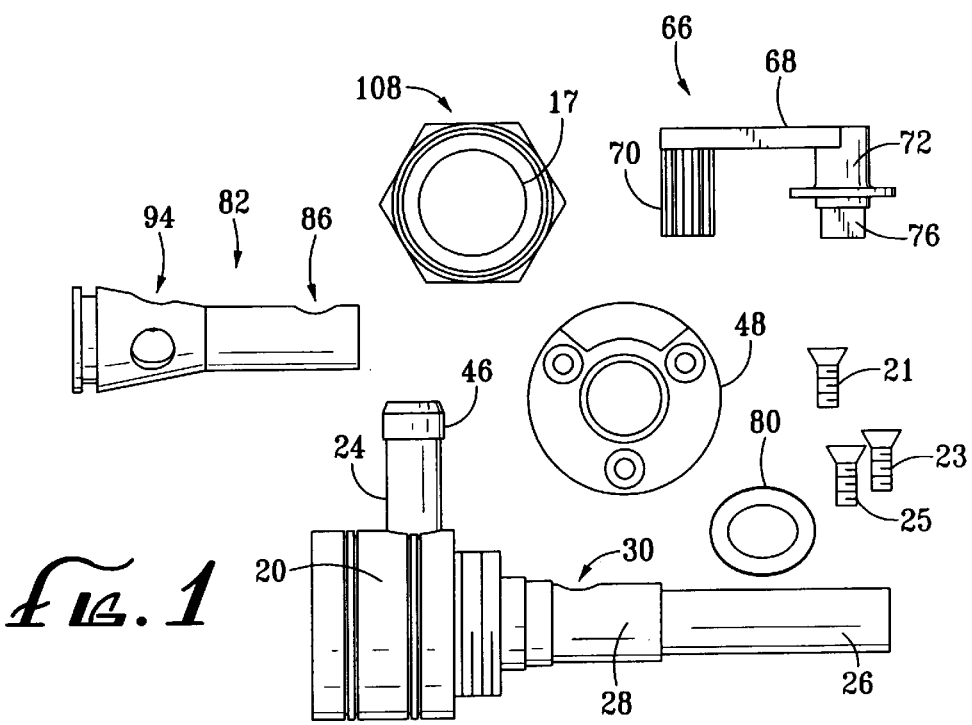
fig.1
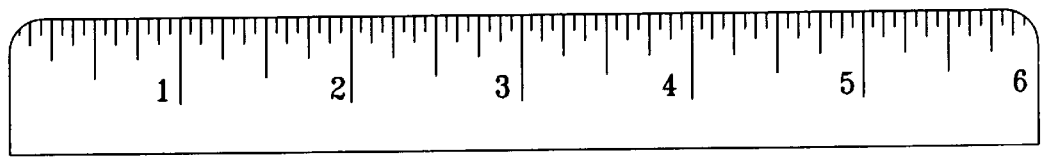
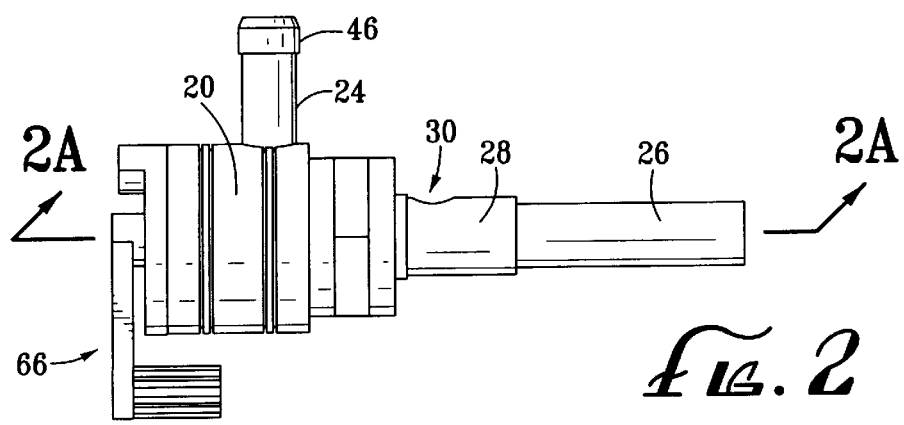
fig.2
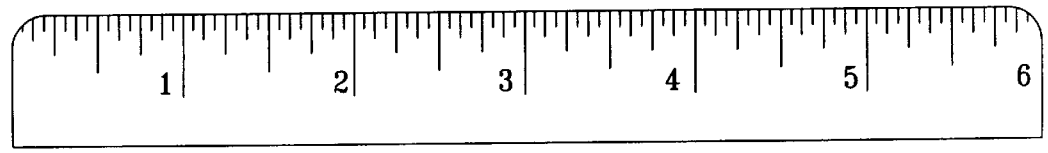

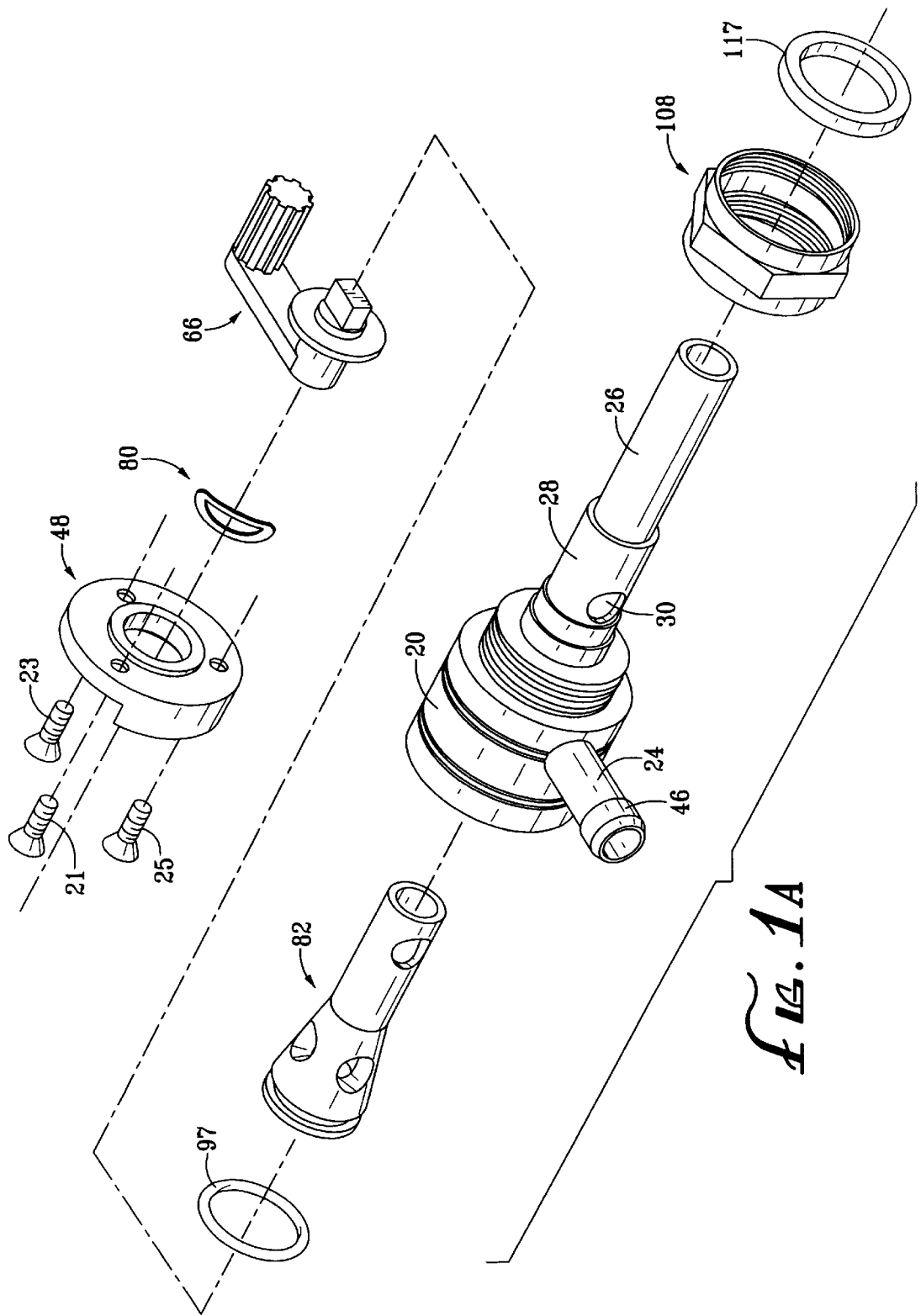

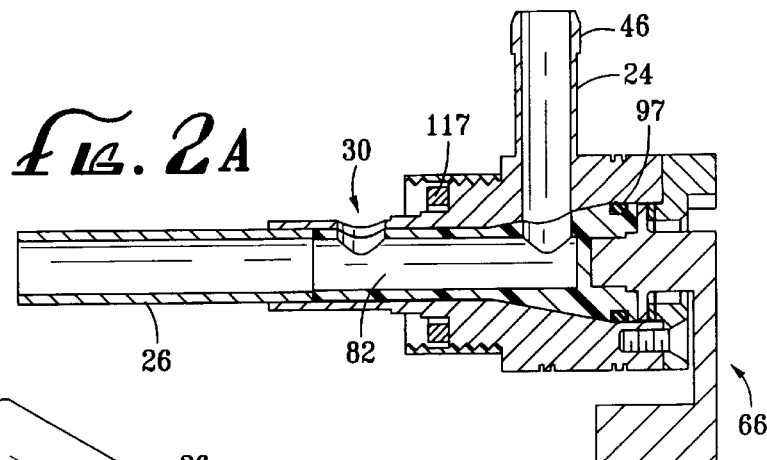
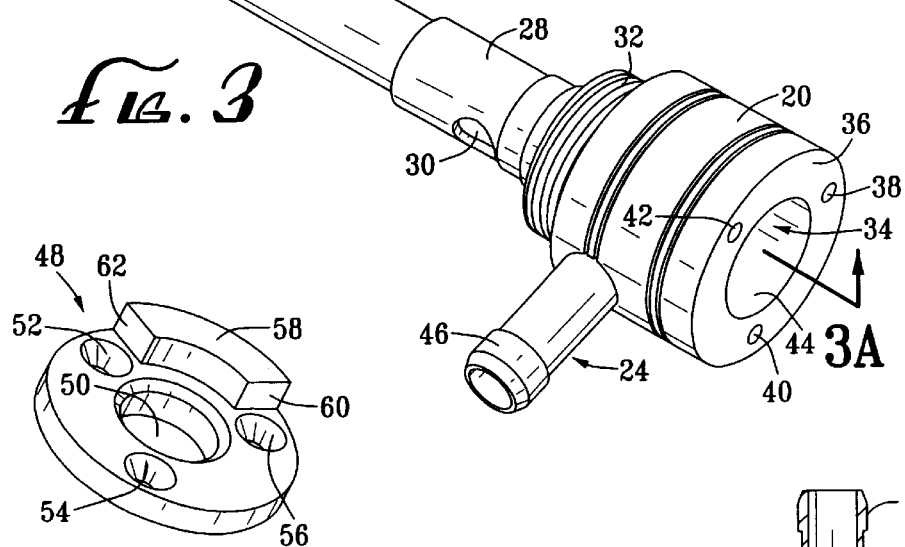
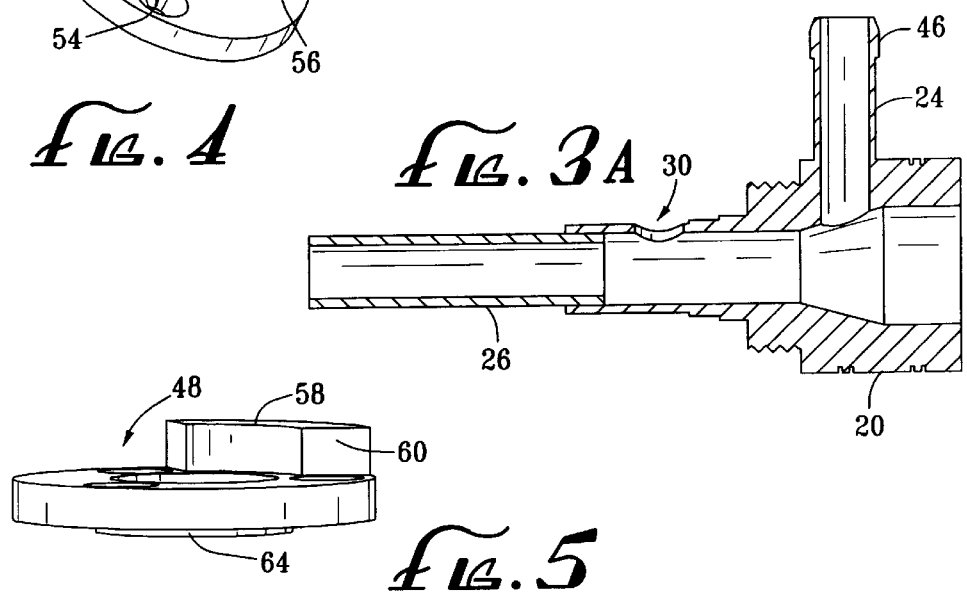

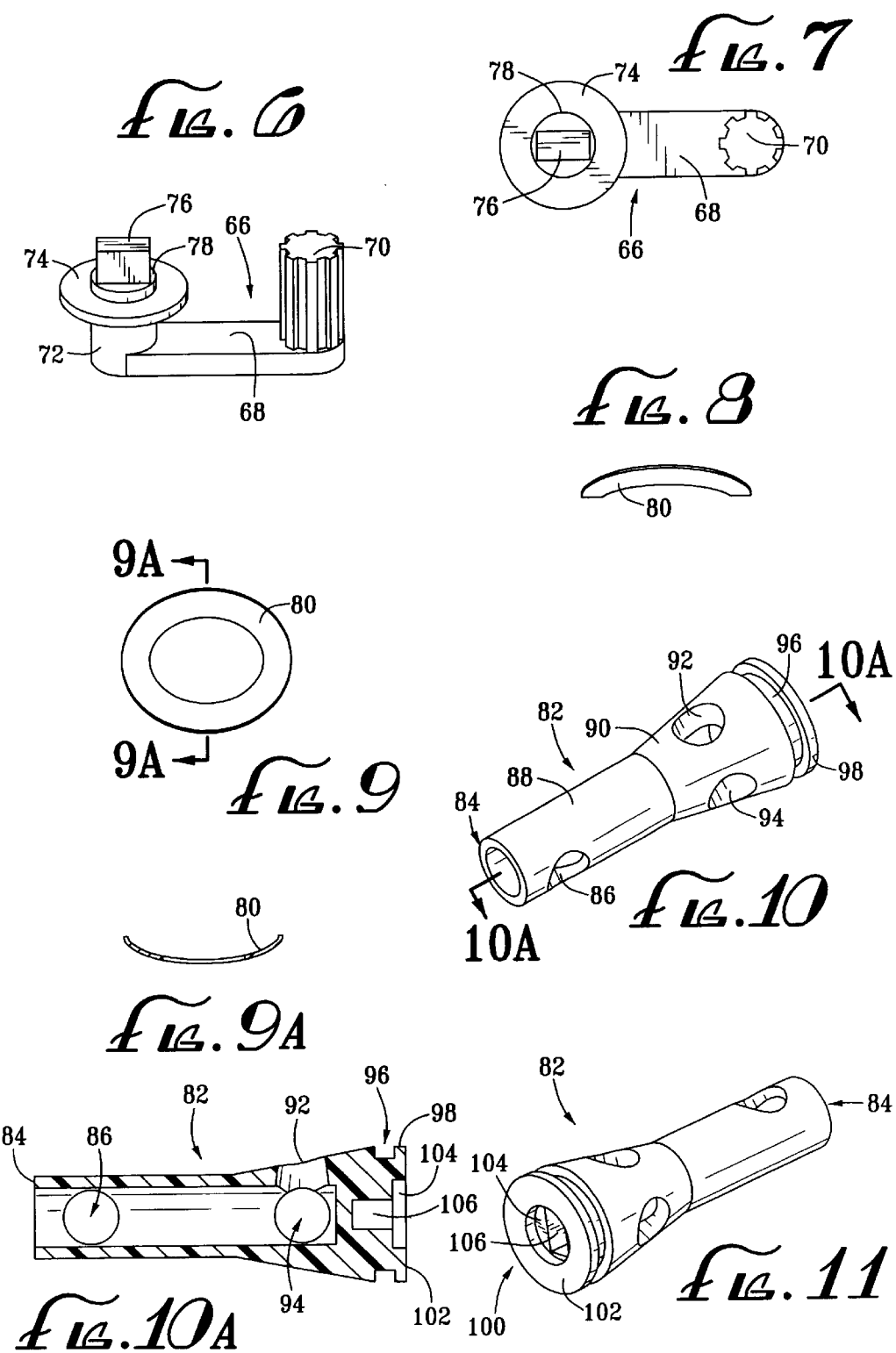

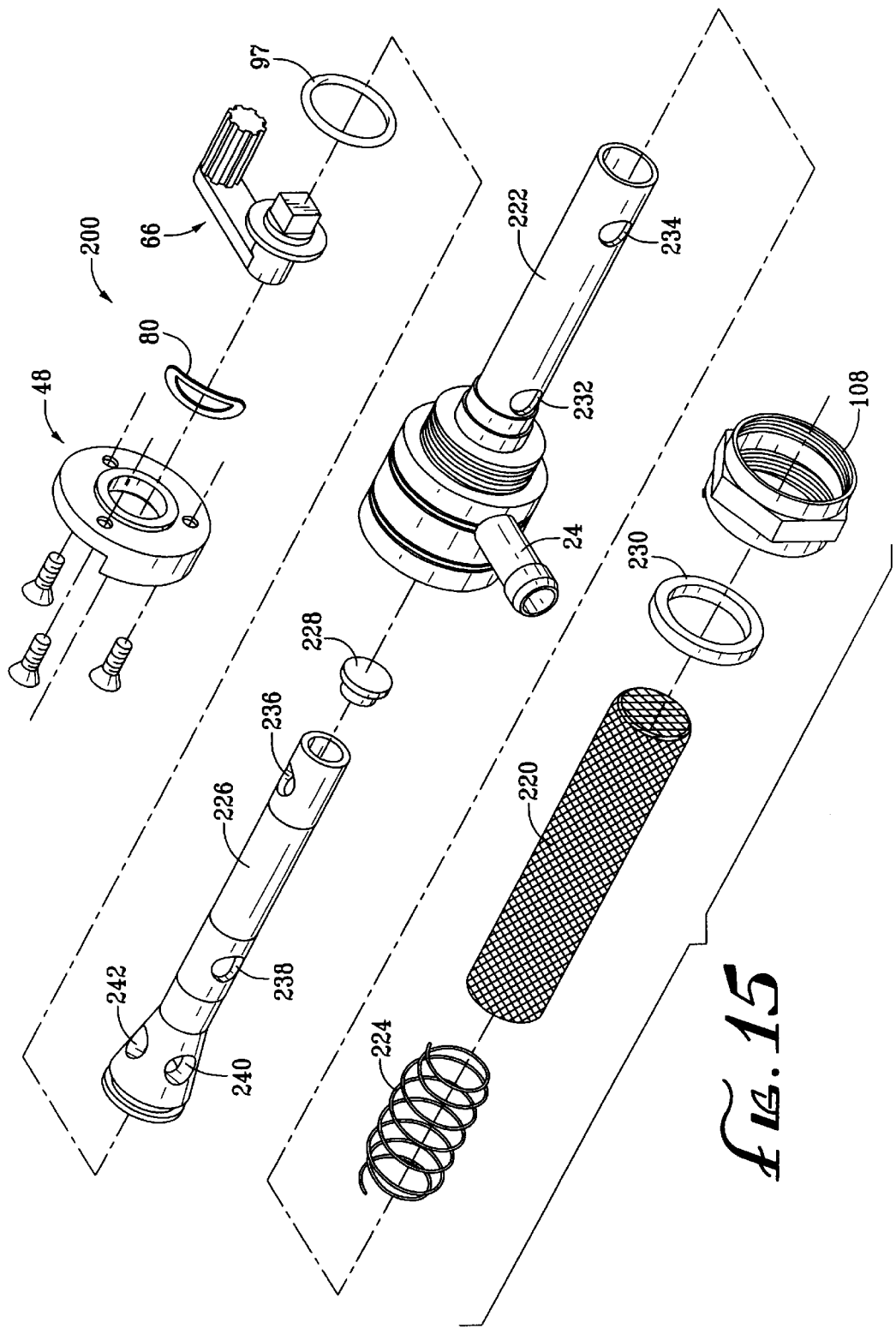

MOTORCYCLE FUEL SYSTEM PETCOCK VALVE

BACKGROUND OF THE INVENTION

This application claims priority from provisional application Ser. No. 60/070,066, filed Dec. 30, 1997.

FIELD OF THE INVENTION

The present invention is directed to a multi-position fuel line petcock valve, preferably adapted for use in a motorcycle.

OBJECTS AND SUMMARY OF THE INVENTION

The present invention is directed to a fuel valve petcock which includes a valve housing, an inlet section including provision for reserved supply of fuel, a main housing, a piston including a reserve inlet orifice or port radially in line with a reserve outlet orifice or port and including normal fuel outlet port which is out of line radially with the line joining the reserve inlet port and the reserve outlet port but located at the same longitudinal position along the piston, further including a handle which has a full open stop, a full shut stop, and an intermediate reserve position, with the fuel handle capable of three different orientations so as to provide for three different orientations of the fuel outlet with respect to the handle.

It is an object of the invention to provide a multi-position fuel line petcock valve with an operator that may be quickly rotated from a full on to a full off position, and to an intermediate position for using the reserve fuel supply.

It is a further object of the present invention to provide a fuel line petcock valve which has multiple orientations of the outlet with respect to the valve operator, or handle, so as to be adaptable to different motorcycle fuel system designs.

It is a further object of the present invention to provide a fuel line petcock valve which may be easily disassembled, cleaned and/or repaired, and reassembled, while providing a simple, sturdy and reliable construction.

BRIEF DESCRIPTION OF THE DRAWINGS

FIG. 1 is a side view of a first preferred embodiment of the present invention, disassembled and shown adjacent to a ruler.

FIG. 1A is an exploded, perspective view of the FIG. 1 embodiment.

FIG. 2 is a side view of the preferred valve of FIG. 1, assembled.

FIG. 2A is a cross-sectional view of the FIG. 1 embodiment, taken along line 2A—2A of FIG. 2.

FIG. 3 is a side perspective view drawing of the main body portion of the FIG. 1 embodiment.

FIG. 3A is a cross-sectional view of the main body portion of the FIG. 1 embodiment, taken along line 3A—3A of FIG. 3.

FIG. 4 is a is a side perspective view of the end cap of the FIG. 1 embodiment.

FIG. 5 is an alternate side perspective view of the end cap of the FIG. 1 embodiment.

FIG. 6 is a side perspective view of the handle of the FIG. 1 embodiment.

FIG. 7 is a top view of the handle of the FIG. 1 embodiment.

FIG. 8 is a side view of the spring washer of the FIG. 1 embodiment.

FIG. 9 is an alternate perspective view of the spring washer of the FIG. 1 embodiment.

FIG. 9A is a cross-sectional view of the spring of the FIG. 1 embodiment taken along line 9A—9A of FIG. 9.

FIG. 10 is a first end perspective view of the piston of the FIG. 1 embodiment.

FIG. 10A is a cross-sectional view of the piston of FIG. 1 embodiment taken along line 10A—10A of FIG. 10.

FIG. 11 is a second end perspective view of the piston of the FIG. 1 embodiment.

FIG. 15 is an exploded, perspective view of the FIG. 14 embodiment.

DESCRIPTION OF THE PREFERRED EMBODIMENT

Figure 12:
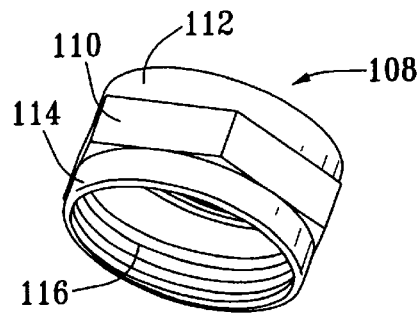
FIG. 12 is a first end perspective view of the retaining nut of the FIG. 1 embodiment.

Referring to FIGS. 1–13, the preferred embodiment of the present invention will be described. FIG. 1 is a side view of the preferred embodiment of the present invention, including a ruler located at the bottom to show the approximate, actual size of the preferred embodiment. FIG. 1 shows the valve disassembled.

FIG. 2 is a side view of the FIG. 1 valve but in an assembled condition. A ruler is also shown at the bottom of the drawing to indicate scale.

Referring to FIGS. 1, 1A, 2, 2A, 3 and 3A the present embodiment valve includes a main body or housing 20 an inlet section 26 and a reserve section 28. The lower, outlet section includes a frustoconical cavity. Extending orthogonal from the main body 20 is outlet 24. Also as shown in FIGS. 1, 1A, 2 2A, 3 and 3A the reserve section 28 includes a reserve inlet port 30. At the inlet end of the main body 20 left hand threads 32 are included, preferably of ⅞" outer diameter. Internal to the main body 20 is main chamber or cavity 34 and at the end of the main body 20 is end face 36 into which three bores 38, 40 and 42 are positioned for retaining screws, as will be described later. Also positioned in the center at the end 36 is a main central bore 44. Each of the components 20, 28 and 26 are tubular members which include hollowed out interior portions. The outlet 24 has a nipple portion 46 for retaining a correspondingly sized outlet hose. The preferred materials of construction for the valve are brass, aluminum or stainless steel. Alternatively, other materials of construction may be used so long as they provide sufficient strength, durability and corrosion resistant properties.

Referring to FIGS. 4 and 5, the end cap 48 will be described. The end cap 48 is an annulus including a central bore 50 and three set screw retaining bores 52, 54 and 56 positioned and sized to correspond to the bores 38, 40 and 42 of the body 20. Also positioned on the external, or outer periphery of the end cap 34 is an on/off positioning stopper shoulder or handle abutment member 58. The on/off stopper 58 includes a first end 62 which, in the preferred embodiment is the rest position for the valve operator in the fully off position. At the other end of the stopper 58 shoulder, an end 60 marks the stopping point for the valve operator or handle in its fully on position. Alternatively and as will be described below, the piston and valve operator may be configured to rotate in an opposite direction with respect to the on/off positions and/or configured so as to have the on and off positions in different radial positions with respect to the orientation of the outlet 24. As shown in FIG. 5, a raised annular portion 64, also referred to as the spring positioning or retaining member 64 is shown.

Figure 20:
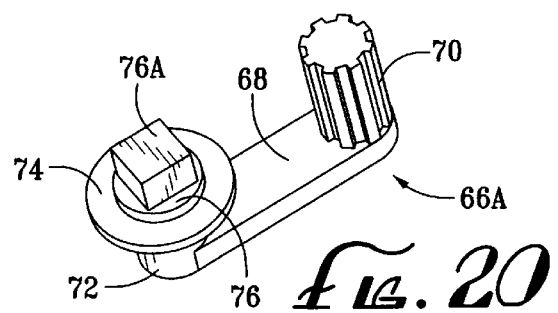
FIG. 20 is a side, perspective view of an alternate embodiment of the handle or actuator of the present invention.

Referring to FIGS. 6 and 7, the handle or valve operator 66 will be described. Handle or operator 66 includes a main or connecting arm 68, a cylindrical handle 70 positioned at one end of the arm 68 and a cylindrical rod or arm 72 positioned at the opposite end of the member 68. Both of the members 70 and 72 are perpendicular to the longitudinal direction of the member 68 and both members 70 and 72 extend in the same direction, although they could extend in different directions. Positioned at a distal end of the member 72 is an operator or handle flange 74 and extending distally therefrom is a raised cylindrical shoulder 78 and extending therefrom is a rectangular key or cam operator 76. Alternatively the operator 76 may be of a different configuration such as square, as shown in FIG. 20, or another configuration so long as it is adapted to match with corresponding seat portion of the piston, as will be described later.

Referring to FIGS. 8 and 9A, spring washer 80 is shown. The preferred spring washer 80 is made of stainless steel, and, as shown in FIGS. 8 and 9A, is of a curved shape in order to provide a spring function. The spring function is advantageous because it provides a spring force to urge the handle or valve operator 76 into the piston seat.

Referring to FIGS. 10, 10A and 11, the piston 82 of the present invention will be described. The piston is preferably made of a polymeric material, such as a fluropolymer, that has good strength and durability in a hydrocarbon fuel environment. Polymeric material sold under the trademark "Delran" is preferred. Piston 82 includes tubular section or neck 88 with an internal fluid passageway and an inlet port 84, and a reserve inlet port 86 positioned in the inlet neck 88. The inlet neck 88 is preferably a cylindrical tube which is open at one end, and at the other end merges with a frusto-conical sealing or outlet section 90. The section 90 functions to provide an excellent seal to prevent fluid leakage. The sealing section 90 includes a normal outlet orifice or port 92 and a reserve outlet port of orifice 94. As shown in FIGS. 10, 10A and 11, the reserve inlet and reserve outlet ports are located along the same radial position with respect to the longitudinal centerline whereas the outlet orifice 92 is radially offset therefrom. At the distal end of the piston is a recess 96 and a lip 98. The recess 96 is sized and configured to retain a conventional O-ring 97, not shown in FIG. 10, but which may be seen in FIG. 1. Referring to FIG. 11, the head 100 of the frustoconical section of the piston is shown. Head 100 includes an annular portion 102 and a recessed portion 104 which has a circular outer periphery and, in the preferred embodiments a square or rectangular receiving portion or seat 106. The receiving portion of seat 106 is configured and sized so as to provide a mating surface or cavity with respect to the valve operator 76, as shown in FIGS. 6 and 7.

Figure 13:
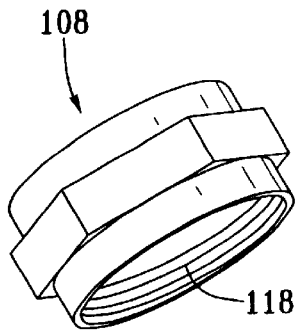
FIG. 13 is a second end perspective view of the retaining nut of the FIG. 1 embodiment.

Referring to FIGS. 12 and 13, a connecting nut 108 is shown. The connecting nut includes a central section 110 having a hex exterior, a first, cylindrical end 112 and a second, cylindrical end 114. The hex section 110 may, of course, be of other configurations, so long as it is capable of functioning as a seating surface for turning and tightening the nut to a desired degree of torque. Internal to the nut 108 are two sets of threads, and a central seating surface section. One of the threads is left handed, such as shown at 116 and the other set of threads at the opposite end being right hand threads 118. The washers are preferably made of a fluoropolymer material, one of which is shown in FIG. 1 and shown seated in the nuts in FIGS. 1 and 2A at 117.

In assembly, the nut 108 is threaded over threads 32 at one end, and to the fuel tank, preferably of a motorcycle, at the other end to provide for connection of the petcock fuel valve to the fuel tank of the vehicle. Assembly of the handle at the end of the chamber includes placement of the spring 80 around the member 70 over the arm 68 and then around the member 72, and up facing and touching the underside of cylindrical portion 74, as shown at FIG. 6. The handle 66, having the spring 80 positioned thereon is then inserted into the piston, which previously has been inserted into the valve body 20. The portion 76 of the handle 66 is inserted into the receiving chamber 106. Next, the end cap 48 is inserted over the members 70, 68 and 72 of the handle 62 in the predetermined orientation and the three set screws 21, 23 and 25 are then inserted through the bores as shown in FIGS. 3–5 and tightened to the desired torque.

When assembled, the handle may be rotated between a fully open or fully closed position each of which is indicated by the handle 68 abutting up against the edges 60 or 62 as shown in FIGS. 4 and 5 to render the petcock valve either fully open or fully shut.

When the handle is in an in-between position, that is, halfway between abutting against abutment 60 or abutment 62, the valve is in the reserve position. The reserve position refers to the amount of fuel that is stored in the interior cavities of the portions 26 and 28 of the valve and in the fuel tank between the top of inlet section 26 and reserve inlet 30. Consequently, when the reserve position is selected, fuel from the reserve portions of the tank and valve will flow through the outlet 24.

Advantages of the presently described invention include its durable, sturdy construction which render it easily taken apart, cleaned and/or repaired if damaged, and then reassembled by the user. Also, with reference to FIGS. 2 and 2A, the outlet 24 is shown in one position relative to the valve operator or handle 66. This configuration is adapted for certain motorcycle fuel systems. However, fuel systems in other motorcycles require the orientation of the outlet 24 to be at an angle different from that shown in FIGS. 2 and 2A and, the present invention additionally, is advantageous because the orientation of the outlet 24 may be changed relative to the orientation of the handle or valve operator 66. This provides an additional advantage so that the present valve may be used for all known motorcycles, and, for this reason, is believed to be unique in the field of motorcycle fuel vapor petcocks. To achieve a different orientation, the end cap is simply removed, rotated to one of the other two positions relative to the location of the outlet 24, and refastened at bores 52, 54 and 56, as shown in FIG. 4.

Figure 14:
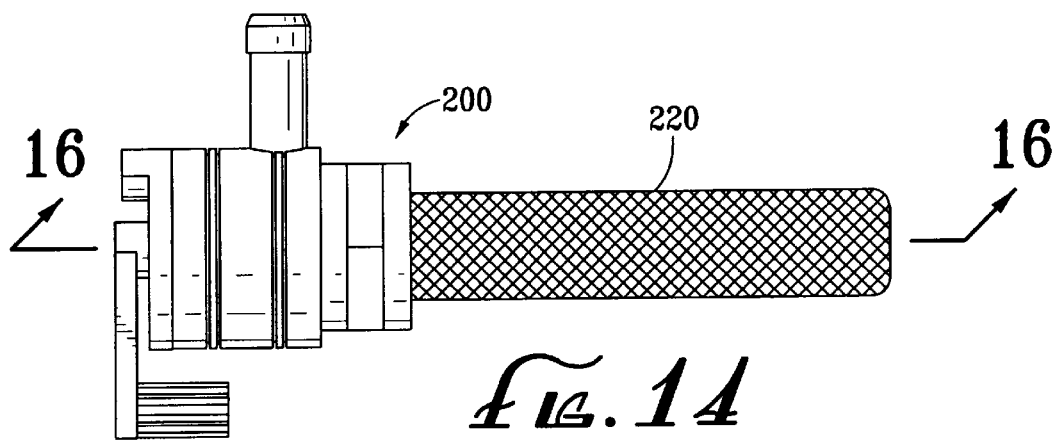
FIG. 14 is a side view of a second preferred embodiment of the present invention.

With reference to FIGS. 14–20 a second preferred embodiment of the present invention will be described. In general, the components of the fuel system petcock valve of the second preferred embodiment are the same as the first embodiment, and will not always be numbered in FIGS. 14–20. Those components which are different in the second embodiment as compared to the first embodiment will be described in detail. With reference to FIGS. 14–15, the second embodiment, fuel system petcock valve 200 includes a screen, strainer, or filter 220 positioned over the fuel inlet or stem section 222 of the valve. The screen material is preferably of a metal or metal alloy material, suitable for use in gasoline and/or other fuel environments. The mesh size of the screen should be chosen for a particular application, and is chosen so as to provide a filtering or screen function but without adversely affecting the flow through of fuel from the tank to the engine.

Figure 16:
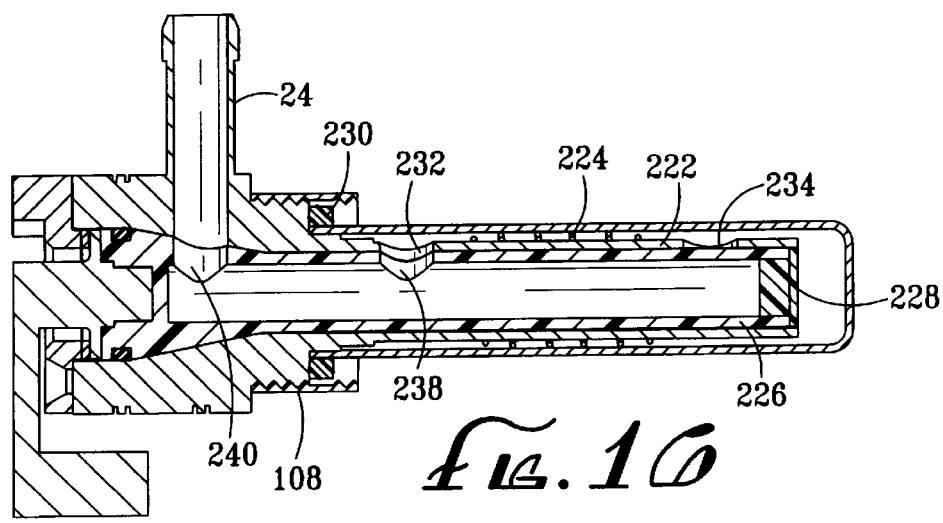
FIG. 16 is a side, cross-sectional view of the FIG. 14 embodiment, taken through line 16—16.
Figure 17:
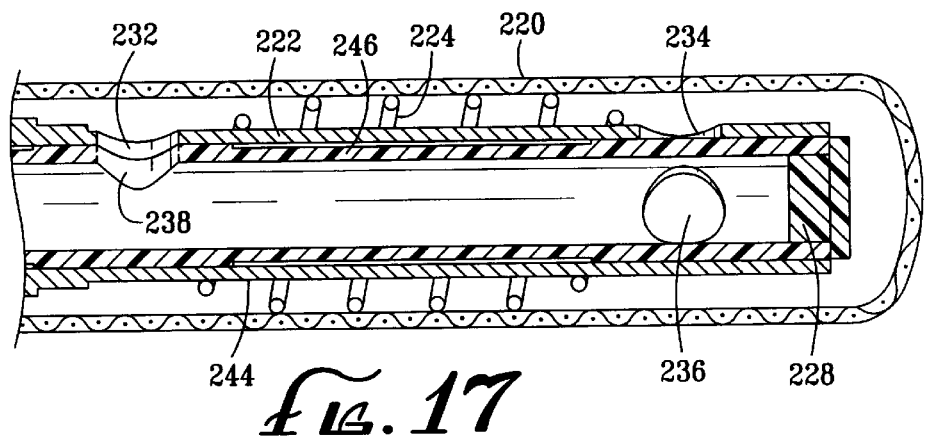
FIG. 17 is a partial, enlarged cross-sectional view of a portion of the FIG. 14 embodiment.

With reference to FIGS. 14 and 15, the stem 222 in the alternate embodiment is longer than the corresponding portions or stem of the first embodiment of FIG. 1. Typically, and preferably, the length of the stem 222 of FIG. 15 is approximately 0.3 inches longer than the total length of the corresponding sections 26 and 28 of the FIG. 1 embodiment. The FIG. 14 embodiment also has an extended length piston 226 which has two sets of ports or orifices as shown. The normal fuel inlet port 236 and normal fuel outlet port in the truncated cone section of the piston at 242, are collinear along the length of the piston as shown in FIG. 15. The reserve fuel inlet port 238 and reserve fuel outlet port 240 are also collinear, but radially offset at approximately 90°, from the normal inlet and outlet orifices, as also shown in FIG. 15. Other degrees of offset also may be used. An endcap 228 are also provided for the piston 242. Preferably, the piston 242 and endcap 228 is made of a conventional, polymeric material suitable for use in a fuel environment, such as Delran brand material. Surrounding the outside of the stem 222 is a conventional coil spring 224 and surrounding the coil spring 224 is positioned the screen or strainer 220. The spring 224 is sized so that it fits snugly between the screen 220 and the stem 222 and provides for not only a space within which fuel may flow between the screen 220 and the stem 222, but also helps retain the screen 220 in its place and assists in retaining its shape during use. With reference to FIGS. 15 and 16, it may be seen that the nut 108, clamping down on the washer 230 forces the washer 230 against the bottom portion of the screen 220 to securely retain the screen 220 in place and extending over the stem portion 222 of the valve. With reference to FIGS. 16 and 17, it may be seen that the hollow, frustoconical piston 226 is oriented within the hollow body and stem 222 in the "reserve" position. In this position, the normal fuel inlet port 236 is not in alignment with the normal stem fuel inlet 234. Rather, the reserve piston fuel inlet 238 is aligned with the reserve stem inlet port 232 so that fuel may flow from the tank through the sieve or screen 220 through the inlet ports 232 and 238, then through the internal channel or passageways of the piston, and then out of the reserve fuel outlet port 240 to the housing outlet 24.

The piston, as mentioned above, is preferably of a durable, inert polymeric material suitable for hydrocarbon fuel environments. As shown in FIG. 17, the outer periphery of the piston, between the normal inlet port 236 and reserve inlet port 238 has a plurality of shallow channels as shown, in the cross-sectional FIG. 17 view at 246, and 244. These channels provide space between the outer periphery of the polymeric piston, and the inner surface of the stem 222 and, as has been discovered, provide for a greater ease of rotation of the piston with respect to the stem, without causing leakage between the stem and the piston. It has been discovered that in the absence of having such channels, rotation of the piston with respect to the stem was difficult because of the relatively high friction between the piston and the valve body. The number of channels, depth of the channels, and width of the channels may vary according to the specific application. However, the number, depth and width should be chosen so that an effective seal between the inside of the stem 222 and the outside of the piston 226 is maintained, consistent with providing ease of rotation of the piston with respect to the stem 222 during normal use.

Figure 18:
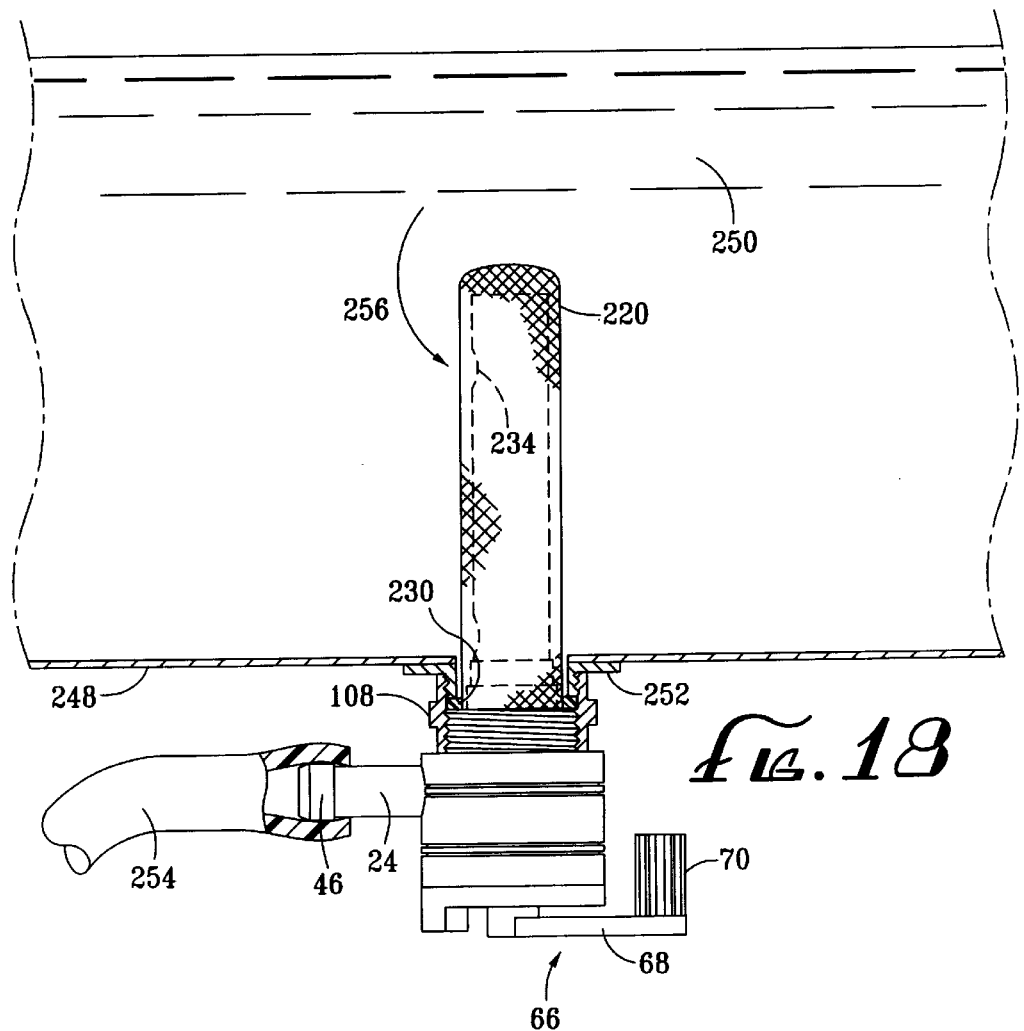
FIG. 18 is a side, partial cross-sectional view of the FIG. 14 embodiment shown installed in a fuel tank in a normal configuration.
Figure 19:
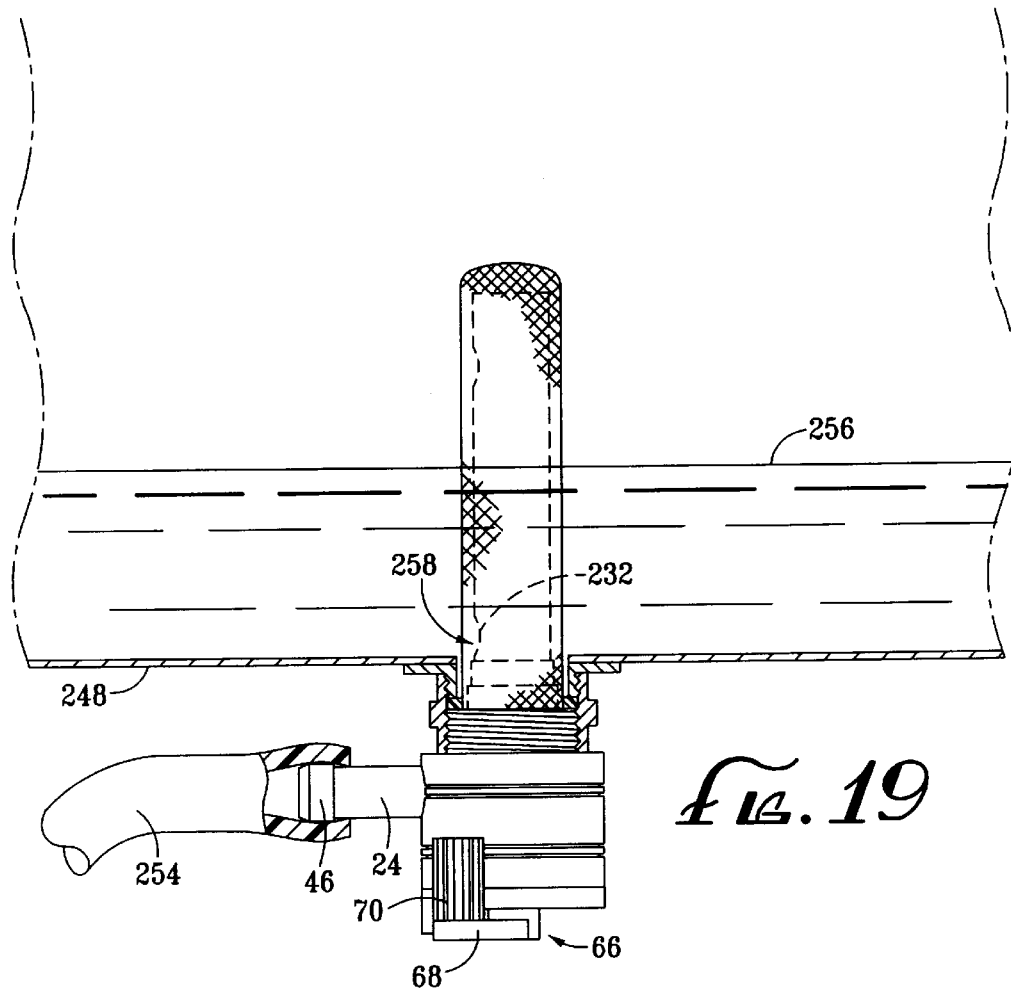
FIG. 19 is a partial cross-sectional view of the FIG. 14 embodiment shown installed in a fuel tank and in the "reserve" configuration.

FIGS. 18 and 19 show the FIG. 14 embodiment of the valve installed in a fuel tank, in, alternatively, a normal position and in the "reserve" position. FIG. 18 shows the valve installed in a fuel tank 248 at coupling 252 and with being relatively full of fuel 250, i.e., the fuel level being above that of the strainer 220. The valve outlet 24 is connected to a fuel line 254 and the nut 108 has been tightened down to securely engage the valve, at the washer 230, to the tank. The handle or valve operator 66 is shown in a normal position, with the cylindrical handle 70 extending to the right in FIG. 18 and the horizontal member 68 extending in a left to right direction along FIG. 18. In this configuration, fuel 250 flows in the direction of arrow 256 through normal fuel inlet port 234 of stem 222, then through the internal channel or passageway of the valve and through valve outlet 24 and into the fuel line 254.

FIG. 19 shows the tank 248 having a relatively low fuel level, at 256, and the valve handle or operator 66 positioned in the "reserve" position. As shown in FIG. 19, the cylindrical handle member 70 is directly in front of the valve, and the horizontal member 68 extends down into the page. In this configuration, the fuel enters through the lower portion of the valve, shown at arrow 258, and flows through the stem inlet port 232, then through the internal channels or passageways of the valve, through valve outlet 24 and then into the fuel line 254.

FIG. 20 shows an alternate handle or valve operator 66A. The handle 66A is identical to handle 66 as shown in FIGS. 6 and 7, except that the cam operator is of a square configuration, as shown at 76A, rather than of a rectangular configuration, shown at 76 in FIGS. 6 and 7.

As may be obtained with respect to FIGS. 14 through 19, and the above description, the alternate embodiment provides a longer stem 222, longer piston 226 and thus a greater distance between the normal and reserve fuel inlets, to thus provide a greater amount of reserve fuel for a given size of fuel tank. Also, the screen or strainer 220 provides an additional straining or screening function to prevent particulate material from entering the fuel line and getting into the engine itself. Furthermore, the plug, strainer 220 and coil spring 224 cooperate together to provide a path for the fuel through the fuel valve in a way to minimize the possibility of creating a siphon effect.

The plug 228, screen 220 and coil spring 224 cooperate together to provide a means for eliminating or minimizing the siphoning effect that might otherwise occur. Without such components, fuel might flow up from the reserve inlet port and be siphoned up through the region between the screen 220 and the stem 222 and through the normal inlet 224 and 236, to thereby rob reserve fuel. In the present design of FIGS. 14–19, sufficient flow interruptions are provided so as to minimize or eliminate the potential for such a siphoning effect.

Also, plus 228 in cooperation with the location of the ports on the rotatable piston, prevents air from being drawn into the fuel line during "reserve" operation. As may be observed from the drawings, rotation of the piston to reserve will block the top, inlet port on the stem.

It will be understood that certain features and subcombinations are of utility and may be employed without reference to other features and subcombinations as they are outlined within the description above and within the claims appended hereto. While the preferred embodiments and application of the invention have been described, it is apparent to those skilled in the art that the objects and features of the present invention are only limited as set forth in the claims appended thereto.

I claim:

1. A fuel system petcock valve comprising:
    a hollowed main body having an outlet orifice, a hollowed inlet extension an a hollowed, truncated conical piston receiving section;
    a piston positioned inside the body and configured to conform within the hollowed inlet extension and having a hollowed, truncated conical portion adapted to conform within the hollowed, truncated conical piston receiving section of the body;
    an operator positioned at one end of the main body and adapted to rotate the piston within the main body about an axis of rotation;
    the hollowed inlet extension extending in the direction of the axis of rotation and beyond the piston, and having at least a first inlet extension inlet orifice and a second inlet extension inlet orifice;
    the hollowed piston extending along and terminating within the hollowed inlet extension having at least a first piston inlet orifice, a second piston inlet orifice, a first piston outlet orifice, and a second piston outlet orifice; and
    the operator positioned at one end of the main body and adapted to rotate the piston within the main body to provide a first flow path from the first inlet extension inlet orifice through the first piston inlet orifice, through the first piston outlet orifice and through the main body outlet orifice, and to rotate the piston to provide a second flow path from the second inlet extension inlet orifice through the second piston inlet orifice, through the second piston outlet orifice and through the outlet orifice.

2. The valve of claim 1 further including:
    an end cap adapted to retain the operator, positioned at the same end of the main body as the operator; and
    comprising an annulus, a central bore and three set screw retaining bores.

3. The valve of claim 2 further including a raised boss having a first abutment end adapted to define a first rest position for said operator and a second abutment end adapted to define a second rest position for said operator.

4. The valve of claim 1 further including a screen positioned about the outer periphery of the hollowed inlet extension.

5. The valve of claim 4 further including a spring positioned between the screen and the hollowed inlet extension.

6. The valve of claim 1 further including a plug positioned at the distal end of the hollow inlet extension.

7. The valve of claim 1 wherein the hollowed inlet extension includes a closed distal end, the closed distal end being adjacent the first piston inlet orifice.

8. The valve of claim 1 wherein the first piston inlet orifice is orthogonal to the second piston inlet orifice.

9. The valve of claim 1 wherein the second piston outlet orifice and second piston inlet orifice are positioned along the same radial position of the piston, but at different longitudinal positions along the length of the piston.

10. The valve of claim 1 wherein the first piston outlet orifice and second piston outlet orifice are positioned at different radial positions in the truncated conical portion of the piston.

11. The valve of claim 1 wherein the piston and operator are adapted and configured to provide the first flow path in a first radial position of the operator with respect to the main body orifice and to provide the second flow path in a second, different radial position of the operator relative to the position of the main body outlet orifice.

12. The valve of claim 1 wherein the piston is made of a polymeric material.

13. The valve of claim 1 wherein the operator is adapted to rotate the piston to at least a shut off position, a first fuel path position and a second fuel path position.

14. The valve of claim 1 further including an end cap rotatably positioning the operator to the main body, having an operator abutment member, and adapted to be fastened to said main body portion in one of a plurality of positions relative to the position of the main body outlet orifice.

15. The valve of claim 1 wherein the first inlet extension inlet orifice and the second inlet extension inlet orifice are positioned in the same radial position along the inlet extension but at different longitudinal positions along its length.

16. The valve of claim 1 wherein the first piston inlet orifice and the first piston outlet orifice are positioned in the same radial position on the piston but at different longitudinal positions along its length.

17. The valve of claim 1 wherein the piston is made of a fluropolymer material.

18. The valve of claim 1 further including a plurality of channels extending along a predetermined part of the length of the piston.

19. The valve of claim 1 wherein the piston is made of a polymeric material, has a tubular section and an adjoining frustoconical section and the first piston outlet orifice and second piston outlet orifice are positioned in the frustoconical section.

20. A fuel line petcock valve comprising:
    a main housing having a frustoconical cavity positioned at a first end, an outlet port positioned at the first end and a tube having at least two inlet ports and in fluid communication with the cavity and forming a second end of the main housing;
    a hollowed piston having a frustoconical outlet section, at least two outlet ports in the outlet section, a tubular inlet section in fluid communication with the piston outlet section and having at least two inlet ports adapted to be rotatably alignable with at least two main housing inlet ports;
    a valve handle;
    an end cap having a raised valve handle abutment member, said end cap positionable in one of three radial positions relative to the position of the outlet port; and
    the valve handle operative to rotate the piston relative to said end cap and to any of normal, reserve or shut positions from each of said three radial positions relative to the position of the outlet port.

21. A fuel system petcock valve comprising:
    a hollowed main body having an outlet orifice, a hollowed inlet extension and a hollowed, truncated conical piston receiving section;
    a piston positioned inside the body and configured to conform within the hollowed inlet extension and having a hollowed, truncated conical portion adapted to conform within the hollowed, truncated conical piston receiving section of the body;

an operator positioned at one end of the main body and adapted to rotate the piston within the main body about an axis of rotation;

the hollowed inlet extension extending in the direction of the axis of rotation and beyond the piston, and having at least a first inlet extension inlet orifice and a second inlet extension inlet orifice;

the hollowed piston extending along and terminating within the hollowed inlet extension having at least a first piston inlet orifice, a second piston inlet orifice, the second piston inlet orifice orthogonal to the first piston inlet orifice; and the operator positioned at one end of the main body and adapted to rotate the piston within the main body to provide a first flow path from the first inlet extension inlet orifice through the first piston inlet orifice, through the first piston outlet orifice and through the main body outlet orifice, and to rotate the piston to provide a second flow path from the second inlet extension inlet orifice through the second piston inlet orifice, through the second piston outlet orifice and through the outlet orifice.

\* \* \* \* \*